United States Patent
Hamilton, II et al.

(10) Patent No.: US 8,910,043 B2
(45) Date of Patent: Dec. 9, 2014

(54) MODIFYING SPACES IN VIRTUAL UNIVERSES

(75) Inventors: Rick A. Hamilton, II, Charlottesville, VA (US); James R. Kozioski, New Fairfield, CT (US); Paul A. Moskowitz, Yorktown Heights, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1588 days.

(21) Appl. No.: 11/970,290

(22) Filed: Jan. 7, 2008

(65) Prior Publication Data

US 2009/0175559 A1 Jul. 9, 2009

(51) Int. Cl.
*G06F 3/048* (2013.01)
*A63F 13/30* (2014.01)

(52) U.S. Cl.
CPC ............. *A63F 13/12* (2013.01); *A63F 2300/64* (2013.01); *A63F 2300/5546* (2013.01); *A63F 2300/8082* (2013.01); *A63F 2300/5526* (2013.01)
USPC .......................................... 715/706; 715/757

(58) Field of Classification Search
CPC ....................................................... G06F 3/01
USPC .......................... 715/706, 815, 800, 757–759
See application file for complete search history.

(56) References Cited

U.S. PATENT DOCUMENTS

| | | |
|---|---|---|
| 5,815,156 A | 9/1998 | Takeuchi |
| 6,057,856 A | 5/2000 | Miyashita et al. |
| 6,085,256 A | 7/2000 | Kitano et al. |
| 6,289,380 B1 | 9/2001 | Battat et al. |
| 6,370,565 B1 * | 4/2002 | Van Gong ..................... 709/205 |
| 6,748,436 B1 | 6/2004 | Anand et al. |
| 6,963,910 B1 | 11/2005 | Belknap et al. |
| 7,076,525 B1 | 7/2006 | Matsuda et al. |
| 7,386,799 B1 * | 6/2008 | Clanton et al. ................ 715/758 |
| 2006/0258462 A1 * | 11/2006 | Cheng et al. ..................... 463/42 |
| 2008/0059972 A1 * | 3/2008 | Ding et al. ..................... 718/105 |

OTHER PUBLICATIONS

"Universally Unique Identifier", 2006 (http://en.wikipedia.org/wiki/UUID).

* cited by examiner

*Primary Examiner* — Tadesse Hailu
*Assistant Examiner* — Darrin Hope
(74) *Attorney, Agent, or Firm* — Schmeiser, Olsen & Watts, LLP; Mark C. Vallone

(57) ABSTRACT

Methods and arrangements of modifying spaces in virtual universes are discussed. Embodiments include transformations, code, state machines or other logic to receive data from a software agent in a virtual universe, directly or indirectly. The data may be based upon information automatically gathered from data stores outside the virtual universe, including account data and user profile data. The embodiment may also involve developing a user profile of the user in the virtual universe, based upon the data received from the software agent. An embodiment may also involve automatically gathering information from data stores external to the virtual universe. The information may include user account data and user profile information. The embodiment may also include aggregating data for generating the user profile in the virtual universe, based upon the information; and transmitting the data directly or indirectly to the virtual universe.

21 Claims, 6 Drawing Sheets

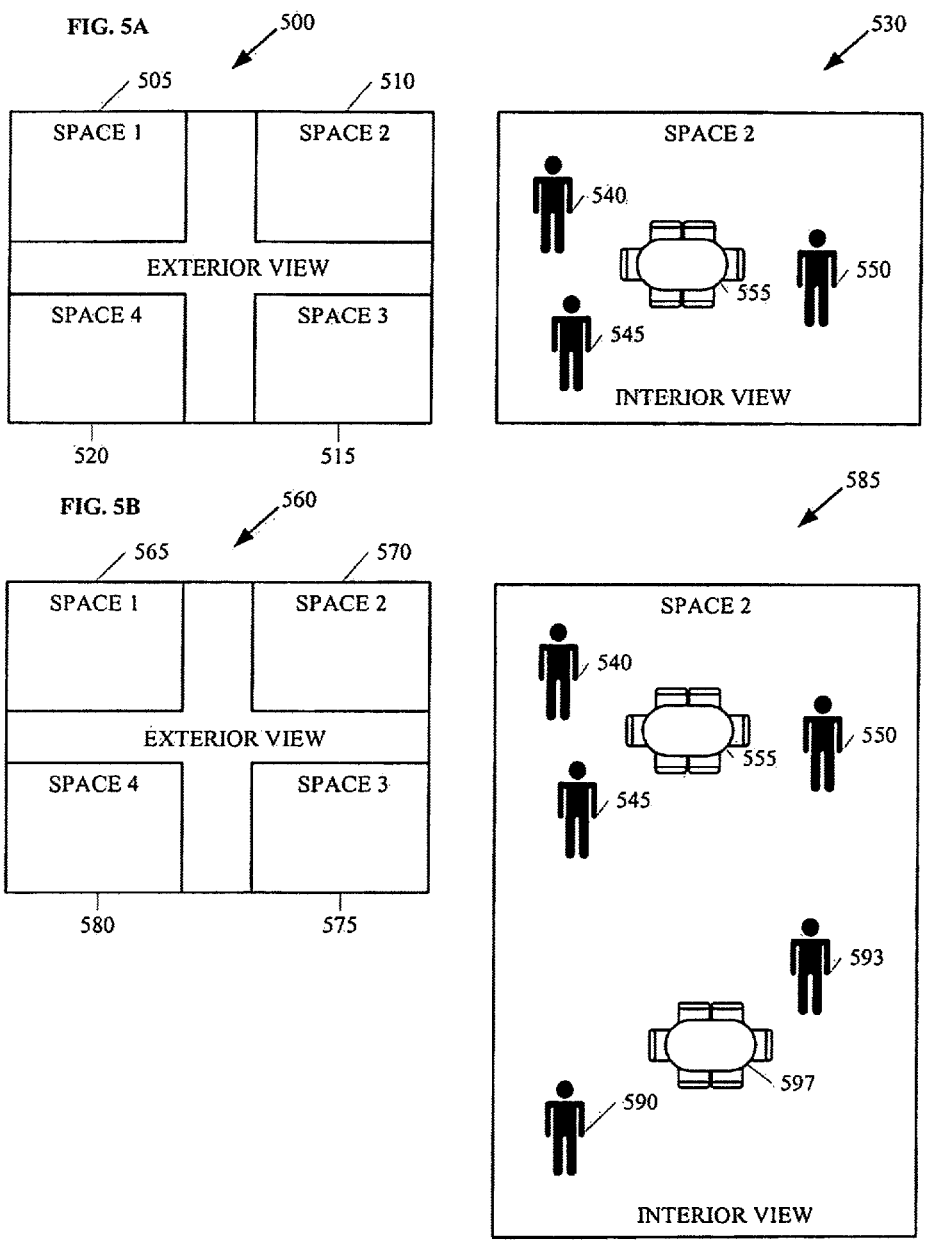

000
MODIFYING SPACES IN VIRTUAL UNIVERSES

FIELD

The present invention is in the field of virtual universes. More particularly, the present invention relates to methods and arrangements to modify the spaces of virtual universes.

BACKGROUND

A virtual universe is a computer-based simulated environment. Users or residents may traverse a virtual universe, inhabit dwellings, and interact with other residents through the use of avatars, two or three-dimensional graphical representations of a character. The environment of a virtual universe may resemble the real world, with real world rules such as gravity, topography, and locomotion; and with social and economic interactions between characters. Many virtual universes allow for multiple residents and provide for communications between the residents. Some virtual universes have many thousands or even millions of residents. Virtual universes may be used for massively multiple player online role-playing games, for social networking, or for participation in imaginary social or business universes.

Virtual universes may provide a useful environment for personal interactions, both business and social. Avatars in virtual universes may undergo a wide range of business and social experiences, and such experiences are becoming more important as business and social transactions are becoming common in virtual universes. In fact, the characteristics of an avatar may play important social, business, and other related roles in virtual universes. One example is Second Life (SL), a privately owned 3-D virtual universe, made publicly available in 2003 by Linden Lab. The SL virtual universe is computed and managed by a large array of servers that are owned and maintained by Linden Lab. The SL client program provides its residents with tools to view, navigate, and modify the SL world and participate in its virtual economy. In 2006, SL had over one million residents. Social and business interactions are important in SL, and these interactions include resident interactions in both personal and business meetings.

A space within a virtual universe can be inadequate for the needs of a virtual universe's residents and designers. As with space in a real world, a virtual universe retail showroom, retail store, home, conference room, or island may not be able to accommodate the number of avatars and objects that a resident or designer of the virtual universe wishes to accommodate. For example, a retailer may purchase real estate on a popular island and build a store. The store is surrounded by other properties, making expansion impossible. The store may then grow in popularity until the store's space can no longer accommodate all of the avatars of customers and the retailer's merchandise and other objects. The retailer needs a permanent expansion. In the real world, and in current virtual universes, the retailer has two alternatives: 1) build a second store and encourage some customers to use it, or 2) move the location of the current store to a new location where its expansion is possible. Neither solution takes advantage of the familiarity and ease-of-use that the store's customers have already accumulated. In theory, another alternative exists, but it is even worse than the others. In this alternative, the building expands into the surrounding, space. For example, a building, that is 20 feet wide may suddenly grow to 100 feet wide, crashing into surrounding buildings, and impinging on other owned spaces, avatars, and landscape features. This alternative is disruptive and may not be allowed in virtual universes.

A second, example of a need for increased space is a virtual universe nightclub whose, owner has booked a popular band to play in the virtual universe. As the show proceeds, more and more avatars arrive, slowing performance of the virtual universe server rendering the nightclub and crowding the space to the point that some customers are turned away. This need for additional space may be temporary. The existing space may suffice except for exceptionally popular acts. A final example is a user of a conference room who arrives only to find it already occupied by another group of users. In this example, the desired additional space—an extra conference room—would be separate from the existing space.

SUMMARY OF THE INVENTION

The problems identified above are in large part addressed by methods and arrangements of modifying spaces in virtual universes. One embodiment provides a method of modifying spaces in virtual universes. The embodiment may involve remapping the interior of a space of a virtual universe. The remapping may include changing the size of the interior of the space, while preserving the spaces bordering the space. The embodiment may include placing avatars and other artifacts in the interior of the space. The embodiment may also include determining a method of accessing the remapped interior of the space.

BRIEF DESCRIPTION OF THE DRAWINGS

Advantages of the invention will become apparent upon reading the following detailed description and upon reference to the accompanying drawings in which like references may indicate similar elements:

FIG. 5A depicts an example space in a virtual universe before remapping;

FIG. 5B depicts the example space of FIG. 5A after remapping;

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit, and scope of the present invention as defined by the appended claims. The detailed descriptions below are designed to make such embodiments obvious to a person of ordinary skill in the art.

Generally speaking, methods and arrangements of modifying spaces in virtual universes are contemplated. Embodiments include transformations, code, state machines or other logic to remap the interior of a space of a virtual universe. The remapping may include changing the size of the interior of the space, while preserving the spaces bordering the space. The embodiment may include placing avatars and other artifacts in the interior of the space. The embodiment may also include determining a method, of accessing the remapped interior of the space.

While specific embodiments will be described below with reference to particular circuit or logic configurations, those of skill in the art will realize that embodiments of the present invention may advantageously be implemented with other substantially equivalent configurations.

Figure 1:
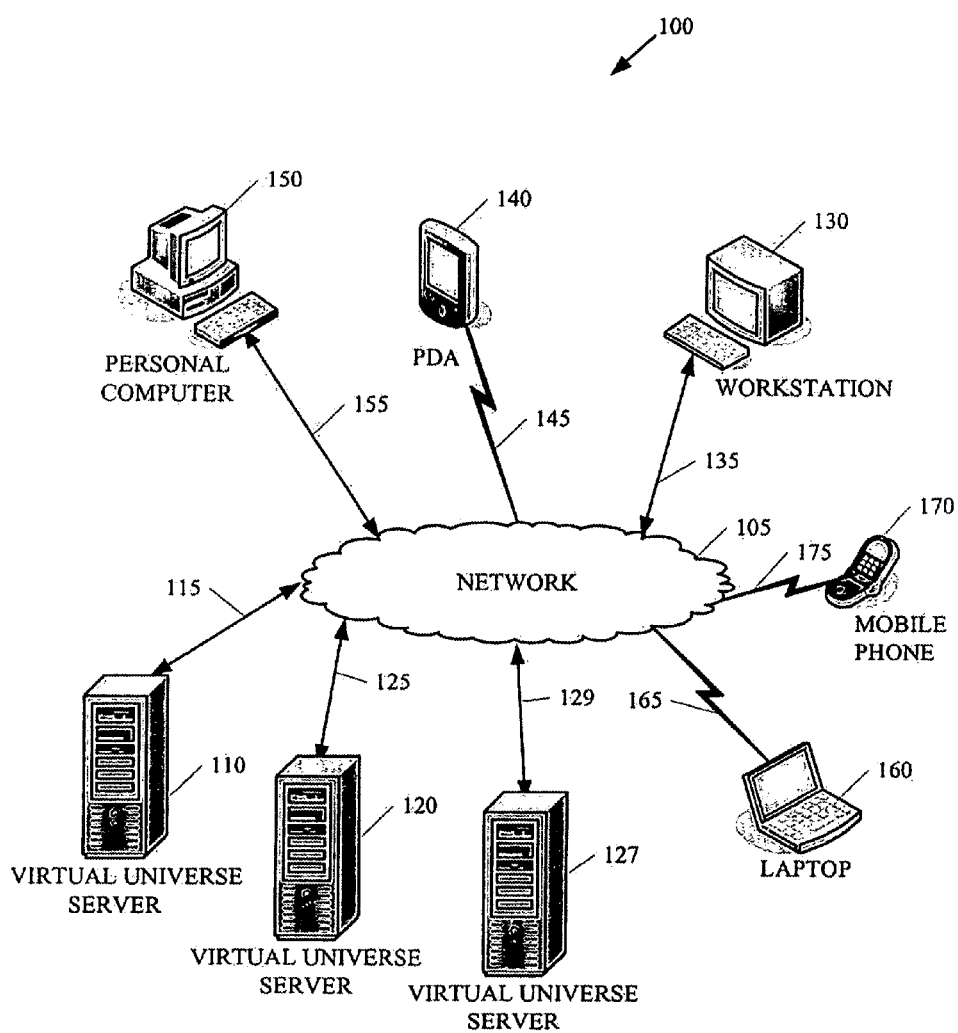
FIG. 1 depicts an embodiment of a networked system of devices capable of modifying spaces in virtual universes.

FIG. 1 depicts a diagram of an embodiment of a networked system 100 of devices capable of modifying spaces in virtual universes. The system 100 includes a network 105, virtual universe servers 110, 120, and 127 respectively connected to network 105 through wireline connections 115, 125, and 129, and a variety of computing devices capable of accessing virtual universes, including:

workstation 130, a computer coupled to network 105 through wireline connection 135, personal digital assistant 140, coupled to network 105 through wireless connection 145, personal computer 150, coupled to network 105 through wireline connection 155, laptop computer 160, coupled to network 105 through wireless connection 165; and mobile phone 170, coupled to network 105 through wireless connection 175.

The devices 130, 140, 150, 160, and 170 may enable a user to interact with a virtual universe. In some embodiments, the devices may run client programs which transmit user input to a virtual universe, receive transmissions from the servers, and process the transmissions. A user's input may establish parameters for the user's account in a virtual universe and cause user objects and avatars to interact with the virtual universe. The transmissions from the servers may contain data representing the interactions. The devices may process the transmissions from the servers to display the interactions or store data about the interactions.

Network 105, which may consist of the Internet or another wide area network, a local area network, or a combination of networks, may provide data communications among virtual universe servers 110, 120, and 127, and the devices 130, 150, 140, 160, and 170.

Virtual universe servers 110, 120, and 127 may have installed and operative upon them software to implement a virtual universe. A virtual universe is a computer-based simulated environment. The environment may resemble the real world, with real world rules such as gravity, topography, and locomotion. Users may be represented by two or three-dimensional graphical representations called avatars. Many, but not all, virtual universes allow for multiple users. Avatars may communicate by text or by real-time voice communication using VOIP. Some virtual universes provide massively multiplayer online role-playing games such as EverQuest, Ultima Online, Lineage, World of Warcraft, or Guild Wars. Other virtual universes provide for simulated economic and social interaction in environments where the focus is more on the participation and less on winning and losing. These virtual universes include Active Worlds, There, Second Life, Entropia Universe, The Sims Online, Kaneva, and Weblo. Still other virtual universes, such as Friendster or MySpace, may provide a social networking experience. A user may enter some virtual universes to share favorite blogs or other web sites with other residents. In some embodiments, the space of a virtual universe may be divided into regions, virtual areas of land within the virtual universe, typically residing on a single server.

The arrangement of virtual universe servers 110, 120, and 127 and other devices making up the exemplary system 100 illustrated in FIG. 1 is for explanation, not for limitation. Data processing systems useful according to various embodiments of the present Invention may omit a server, or may include additional servers, routers, other devices, and peer-to-peer architectures, not shown in FIG. 1, as will occur to those of skill in the art. Other embodiments may include fewer or additional servers. In some embodiments, the virtual universe may be implemented on one of the computing devices such as PDA 140, personal computer 150, laptop 160 or mobile phone 170.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
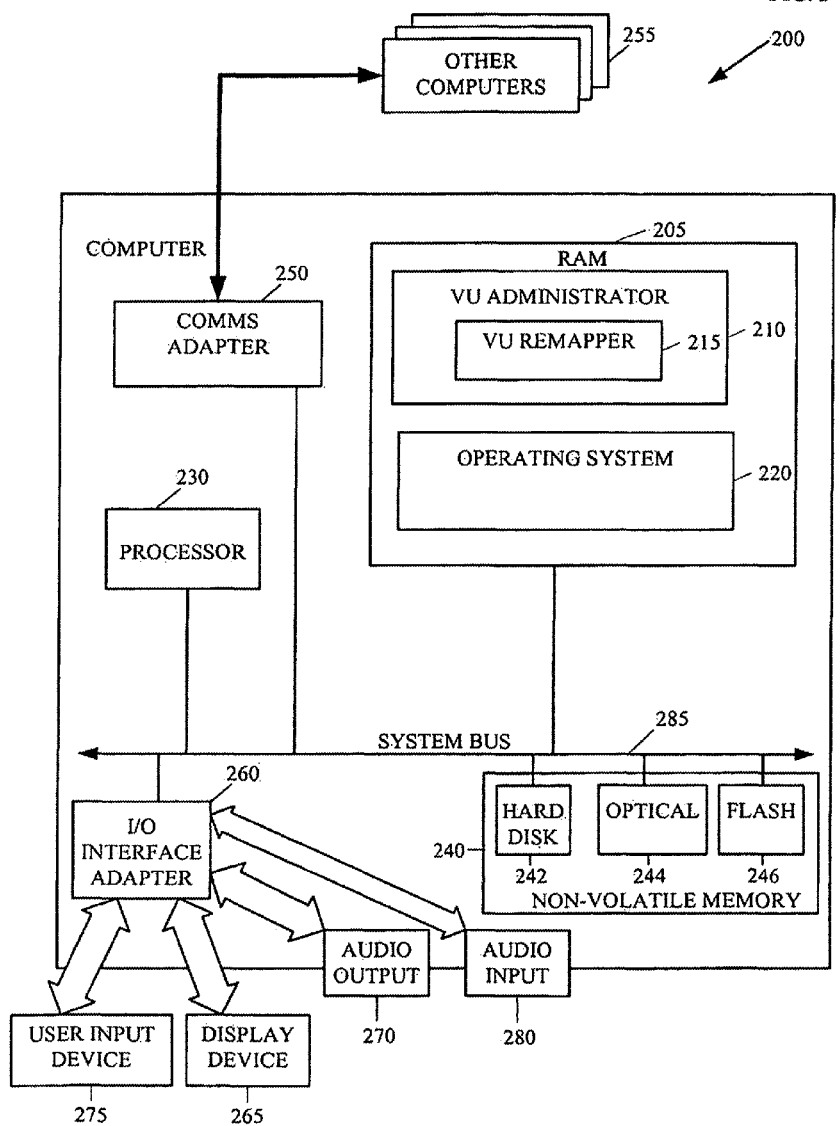
FIG. 2 depicts an embodiment of a computer capable of modifying spaces in virtual universes.

Turning to FIG. 2, depicted is an embodiment, of a computer 200 capable of modifying spaces in virtual universes that includes random access memory (RAM) 205, a processor 230 or CPU, non-volatile memory 240, a communications adapter 250, and an Input/Output (I/O) interface adapter 260 connected by system bus 285. Stored in RAM 205 is virtual universe administrator 210 and operating system 220.

Virtual universe administrator 210 may comprise computer program instructions for implementing virtual worlds. Virtual universe administrator 210 may generate and modify the space of a virtual universe and the artifacts and other objects contained in the virtual universe. In some embodiments, virtual universe administrator 210 may represent objects by geometric data, data about textures, and effects data. The location of objects existing in virtual universe space may be represented by geometric data. In some further embodiments, virtual universe administrator 210 may communicate with a user's virtual world client program. The geometric data may be distributed to client programs of users in the form of textual coordinates. The objects may also possess textures which are represented by graphics files and distributed in formats such as JPEG2000 files. Effects data may be transmitted to a user's client program and rendered by the user's client program according to the user's preferences and capabilities of a user's computing device. The computing device may be similar to one of devices 130, 140, 150, 160, or 170 of FIG. 1. In other further embodiments, a user may interact with virtual universe administrator 210 through a web browser. Virtual universe administrator 210 may also handle the administrative details of a virtual universe, such as creating and modifying account profiles, logging in, and determining which portions of the virtual universe a user may access.

Virtual universe administrator 210 contains virtual universe remapper 215. Virtual universe remapper 215 may change the size of the interior of a space of the virtual universe while preserving the spaces bordering the space. The modifying may include placing avatars and other artifacts in the interior of the space. For example, the interior of retail space may be expanded to hold more customers and more merchandise while the exterior of the space remains unchanged. Virtual universe remapper 215 may also administer payment for the remapping, including a calculation of the fee. Virtual universe remapper 215 may receive a user's request for remapping space in a virtual world and may select parameters for remapping the space. The parameters may include whether the remapping is manual or automatic. A manual remapping may constitute a long-lasting remapping. For example, virtual universe remapper 215 may expand the interior of retail space for a new department. The new department may persist until the owner decides to make another change or the virtual universe decides to changes its methods of operation.

An automatic, remapping of space may change the space based upon conditions occurring within the space or within the virtual universe as a whole. Conditions in the room may be dependent on the people or avatars in the room, such as the number of people in the room or the nature of avatars in the room. Conditions dependent upon the virtual universe as a whole may be based upon time of day or virtual universe server load. For example, a remapping may be triggered if the number of people in a room exceeds 5, if the server has a light load, if the avatars have an associated tag that specifies their importance by some criteria, or number of avatars per square foot, or per cubic foot, is above a threshold. For example, a smart virtual universe room may determine that the number of avatars per square foot, or per cubic foot, is above a threshold, and may then make a request for remapping to expand the space.

Operating system 220 may comprise UNIX™, Linux™, Microsoft Windows™, AIX™, IBM's i5/OS™, or other operating systems useful for modifying spaces in virtual universes as will occur to those of skill in the art. Virtual universe profile translation agent 210 and operating system 220 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile, computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may/implement the hardware level of data communications between computer 200 and other computers, such as other computers 255. The data communications may occur directly or through a network and may include communicating with a virtual universe client program or web browser. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11a/b/g/n adapters for wireless network communications.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In some embodiments, embedded systems, PDAs, cell phones, BlackBerries® and other computing devices which can connect to a network may modify spaces in virtual universes. In many embodiments, modules to modify spaces in virtual universes may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
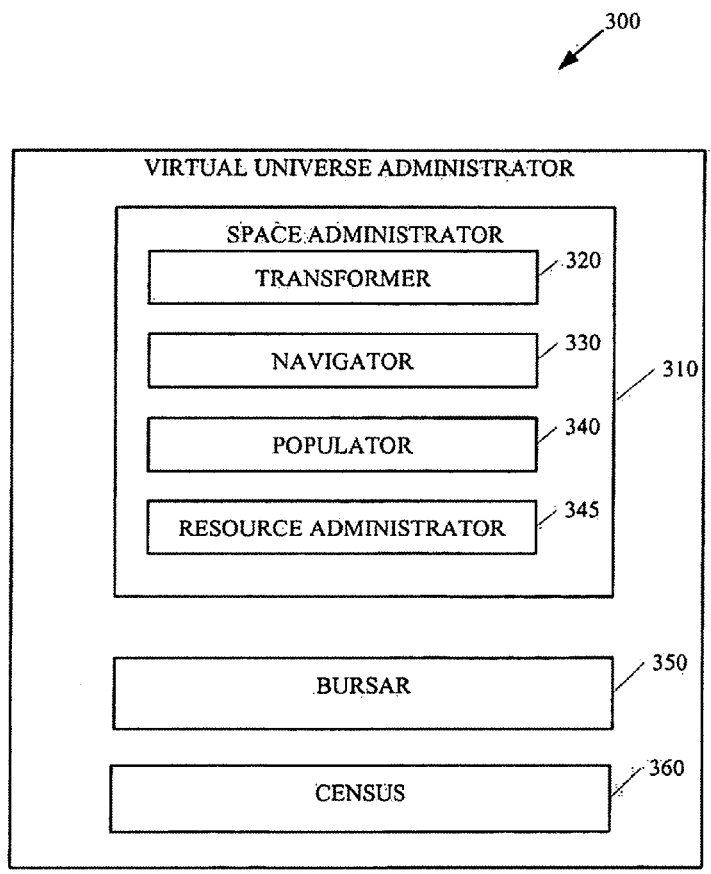
FIG. 3 depicts an embodiment of an apparatus to modify spaces in virtual universes.

For further explanation, FIG. 3 sets forth a block diagram illustrating an exemplary apparatus 300 for modifying spaces in virtual universes. Virtual universe administrator 300 may administer a virtual universe. It may generate and modify the objects of the virtual universe, control the interactions of residents with the virtual universe, and take care of administrative matters. Virtual universe administrator 300 includes space administrator 310, bursar 350, and census 360. Space administrator 310 may administer the modification of space in the virtual world. Modifications may include changing the size of the interior of space in the virtual universe while preserving the spaces bordering the space. Space administrator 310 includes transformer 320, navigator 330, populator 340, and resource administrator 345.

Transformer 320 may remap spaces in a virtual universe. Generally speaking, in the remappings, transformer 320 may redefine the interior of a space while leaving intact the spaces next to or bordering the space. The redefinition may change the size of the interior space, may transform the relationships between points in the space, or may do both.

In many embodiments, the remapping may be defined in terms of coordinates. Space administrator 310 may represent space as coordinates. For example, a point in a two-dimensional 20 foot by 20 foot room may be represented by (x, y) where x is the horizontal distance in feet from the bottom left corner and y is the vertical distance in feet from the bottom left corner, where $0 \leq x, y \leq 20$. In this representation, the point (10, 10) is at the center of the room.

In these embodiments, the remapping may consist of selection of a coordinate grid for the remapped space and the application of a mathematical function to the coordinates of points in the original space to produce coordinates of points in the remapped space. In some further embodiments, the remapping may be linear. For example, a remapping may transform the interior space of the 20 foot by 20 foot room into a 40 foot by 40 foot room. The point (x, y) in the original space may be remapped to the point (2x, 2y) in the remapped space. The effect is to spread out the contents of the room, doubling the distance between objects. In this remapping, the center of the new space is (20, 20). The remapped space has 4 times the area of the original space. The remapped room may hold approximately four times as many avatars as the original room. As another example, the remapped space may again be the 40 foot by 40 foot room, but the mapping may map the point (x, y) to the point (x, y). With this mapping, the contents of the original room are placed in the lower left quadrant of the remapped room. The spatial relationships between those objects are preserved in the remapping. The remapped room is again 4 times as large, and may again hold approximately four times as many avatars or other objects as the original room.

In a few further embodiments, the transformation may contract the space. For example, the remapping may map the original set of points (x, y) into a set of points (x/2, y/2). With this mapping, the volume of the original room has been contracted rather than expanded. The spatial relationships between those objects are preserved in the remapping. The remapped room is now ¼ times as large, and may again hold one-quarter times as many avatars or other objects as the original room. Such a remapping may serve to save computing energy in a case where less space is required than was originally been provided.

In several further embodiments, the transformation may be non-linear. For example, a remapping or rescaling may compress even an infinite-sized space into a cube bounded by −1 and +1. One way to do this makes use of the hyperbolic tangent function:

$$\tanh x = (e^x - e^{-x})/(e^x + e^{-x})$$

A non-linear mapping may create a fisheye effect, producing visual distortions. Remapping computations may be performed in many ways that are known in the geometric literature dealing with scaling and related transformations.

As shown in the above examples, in embodiments using coordinates, a change in size of a change in spatial relationships of the interior of a space may be measured by the coordinates of the points in the space. In some other embodiments, a change in size of an interior of a space may be approximately measured by the objects that fit into the space. For example, the remapped space of a business may hold far more avatars than the original space. Similarly, the movement of the objects may demonstrate a change in spatial relationships. For example, an avatar may take 10 steps in the remapped space that would be equivalent to one step prior to the remapping.

In the above embodiments, the remapping produced a single version of the original space. In other embodiments, the remapping may produce multiple versions of the original space. Conceptually, the remapping represents a projection of the original space into a space with an additional dimension, thus allowing different "versions" of the original space to be available. In embodiments with coordinate systems, a coordinate in the additional dimension refers to the particular version. For example, in a traditional 3-dimensional virtual universe, geometric points may represented by coordinates (x, y, z). The first coordinate may indicate horizontal position, the second coordinate may indicate depth, and the third coordinate may indicate height. When multiple versions of a space in this virtual universe are created, the remapping coordinates (x, y, z, w) may be used to represent points. In this case, the remapped space is four-dimensional, and the remapped coordinates may designate locations in the fourth-dimensional space. The w-coordinate may be used to designate the particular copy. For example, (0, 0, 0, 1) may represent the point (0,0,0) in the original space as it appears in the first version of the original space, and (0, 0, 0, 4) may represent the same point in the original space as it appears in the 4$^{th}$ copy. From a mathematical standpoint, it is possible to then allow avatars to access these higher dimensions which have the same 3-D cross sections with the virtual universes as before the w coordinate was introduced. In many embodiments, the versions of the original space may consist of identical copies of the original space. In some embodiments, the versions may consist of transformations of the original space.

Navigator 330 may control the movement of avatars in the transformed space. When the remapped space has the same dimensions as the original space, navigator 330 may retain the same navigational controls. For example, a user may use the arrow keys. Navigator 330 may determine the distance an avatar travels with a "step." In many embodiments with a linear transformation as the remapping, an avatar may travel the same distance in the remapped space with each step as the avatar did in the original space. Because the remapped space may be a different size, however, the avatar may require a different number of steps to travel through the complete remapped space. In some embodiments with non-linear transformation, the distance an avatar travels with a step may depend upon the portion of the remapped space in which the avatar is located.

In embodiments with multiple versions of the original space, avatars may "move" between different versions of the original space and thus discover different avatars and meetings in each version. In further embodiments, navigator 330 may provide an additional set of keys for movement among the versions. For example, in a typical three-dimensional virtual universe, a fourth set of axis control keys (e.g., "Page Up", "Page Down") may control movement among the versions of the original space. In some other embodiments, navigator 330 may automatically determine which version an avatar enters. For example, a conference room may be transformed into multiple copies. Avatars, representing IBM employees may be sent to one copy of the conference room when they enter the original location, while avatars representing employees of another business may be sent to another copy of the conference room. In still other embodiments, navigator 330 may present a menu of choices of versions of the original space to a user, and the user may select a version.

Populator 340 may fill the remapped space with avatars and other artifacts of the virtual world. In embodiments with a single remapped space, Populator 340 may place the avatars and objects of the original space in the remapped space. In some embodiments with linear transformations, the distance between avatars may grow proportionally. For example, if the dimensions of a room double, the avatars may be located in the remapped room at twice their original distance. In further embodiments, Populator 340 may proportionally increase the size of landmark objects, to allow users to more easily orient themselves. Landmark objects may include doors and other exits, window, murals, and other objects visible from a large portion of the space. In a few embodiments, Populator 340 may insert new objects, such as furniture into the remapped space and expand the apparent boundaries of the space as viewed from within the space. For example, an expanded retail store may contain additional displays, sale items, cash registers, rooms, and furniture.

Resource administrator 345 may assign computational resources to the remapped space. The remapped space may require a different amount of resources than the original space, in order to render objects that may be represented by 3-D geometrical coordinates, meshes, and textures. For example, an increased space may require increased resources. In some embodiments, the server capacity allocated to the work of rendering space may be proportional to the size of the space. The number of servers assigned to rendering remapped space may be equal to the number of servers assigned to rendering the original space times a scaling factor equal to the increase of space. For example, an original space that is a cube with an edge of 1 meter may be remapped to a cube that is 10 meters on an edge. If 1% of a single server was used to render the original space, then 10 servers may now be employed. This calculation may, however, represent an upper-bound to the new server requirements. In practice, most of the remapped space may be empty, and the server capacity calculated by the formula may not be actually needed.

Resource administrator 345 may adopt multiple strategies for assigning computational resources to the remapped space Remapped spaces can be handled by the same server or servers as the original space, handled by a different server or servers from the original space, and divided among a set of servers as specified by the scaling factor of the remapped space. The assignment of computational resources may involve dynamic load rebalancing over the available servers in order to accomplish rendering of the new remapped space.

In some embodiments, virtual world 300 may require a fee for the remapping. For example, embodiments which charge fees based upon space may charge an additional fee for increased space. A user who remaps the interior of an apartment into a luxury suite may pay a fee. Similarly, a retailer who requests an expansion of retail space may pay a fee. These remapping operations may require more sophisticated computations and use more computational and bandwidth resources to render the remapped spaces. Bursar 350 may arrange to collect the fee from the user.

Space administrator 310 may offer a variety of transitions between the original space and the remapped space. The possible relationships include:

Immediate replacement: The remapping may be one-time and immediate (static). Conventional movement into the original space may immediately transfer a user into the remapped space. In some embodiments, the replacement may occur while the space is occupied. Avatars in tire original space at the time of remapping may be immediately transferred to the remapped space.

Gradual replacement: The space may be remapped continually with time based upon a condition occurring in the interior space or in the virtual universe. These conditions may include, but are not limited to, the number or density of people in the room, time of day, the virtual universe server load, and the nature of avatars in the room. Census 360 may measure the number of people in the room or otherwise determine satisfaction of the condition, and may notify transformer 320 when it is time to remap the space.

User-initiated replacement: When the remapped space contains multiple versions of the original space, the user can choose to move into the remapped space by unconventional means, such as movement into another dimension or calling up a new "version" of the original space.

A few examples may illustrate the remapping process and possible advantages of the process. In the first example, a retail store becomes too small for the merchant's needs. The merchant's customers may no longer comfortably fit within the interior or the merchant may desire additional space to display additional merchandise. The merchant may request a static remapping of the entire space inside the store into a new, much larger space. A transformer, such as transformer 320, may remap the space. Optionally, a bursar, such as bursar 350, may collect a fee from the merchant. The experience of a user may be to observe the same storefront and building exterior as before, including the size of the exterior and the distance from surrounding buildings. Upon entry into the store, the space appears much larger to the user, and can accommodate more avatars and objects. Exits from the store may all be proportionally located relative to their appearance from the outside. A user may, therefore, remain aware of the user's location both within the store and within the virtual universe outside of the store interior.

In the second example, the owner of a virtual universe nightclub has booked a popular band to play in the club. As the show proceeds, more and more avatars arrive, slowing performance of the virtual universe server or servers rendering the nightclub, and crowding the space to the point that, some customers are turned away. The owner may purchase an option for a dynamic remapping of the space inside the nightclub into a new, larger space. This remapping occurs only when the space becomes crowded. The experience of a nightclub visitor would then be such that as the crowd grows, the distance between landmark objects in the club (e.g., the stage, the bar, the exit) grows proportionally, thus allowing, for more avatars to fit in the space, and for an easier distribution of the nightclub computational load among several servers.

As a final example, a member of a group scheduled to meet for a conference may arrive at a conference room only to find it already occupied by another group. The group member may request a one-time remapping of the space inside the conference room into two or more versions of the conference room. One version may remain occupied. Members of the group unable to meet in the original conference room may enter another version of the conference room by entering the occupied conference room, then moving into the remapped space. The remapped space appears empty and available for use. In physical and mathematical terms, the other versions of the conference room constitute identical copies of the original conference room projected into the fourth dimension. Avatars may move between different versions of the conference room (i.e., move through this new, fourth dimension), encountering different avatars and meetings in each version. Movement may be controlled by using a fourth set of axis control keys, such as "Page Up" and "Page Down".

The modules of FIG. 3 are for illustration and not limitation. An apparatus for modifying spaces in virtual universes in accordance with embodiments of the invention may omit some of the modules shown, may include additional modules, or may contain different arrangements of modules. In particular, a bursar may be omitted from virtual universe that do not charge fees. Similarly, a census may be omitted if the virtual world does not offer dynamically changing space.

Figure 4:
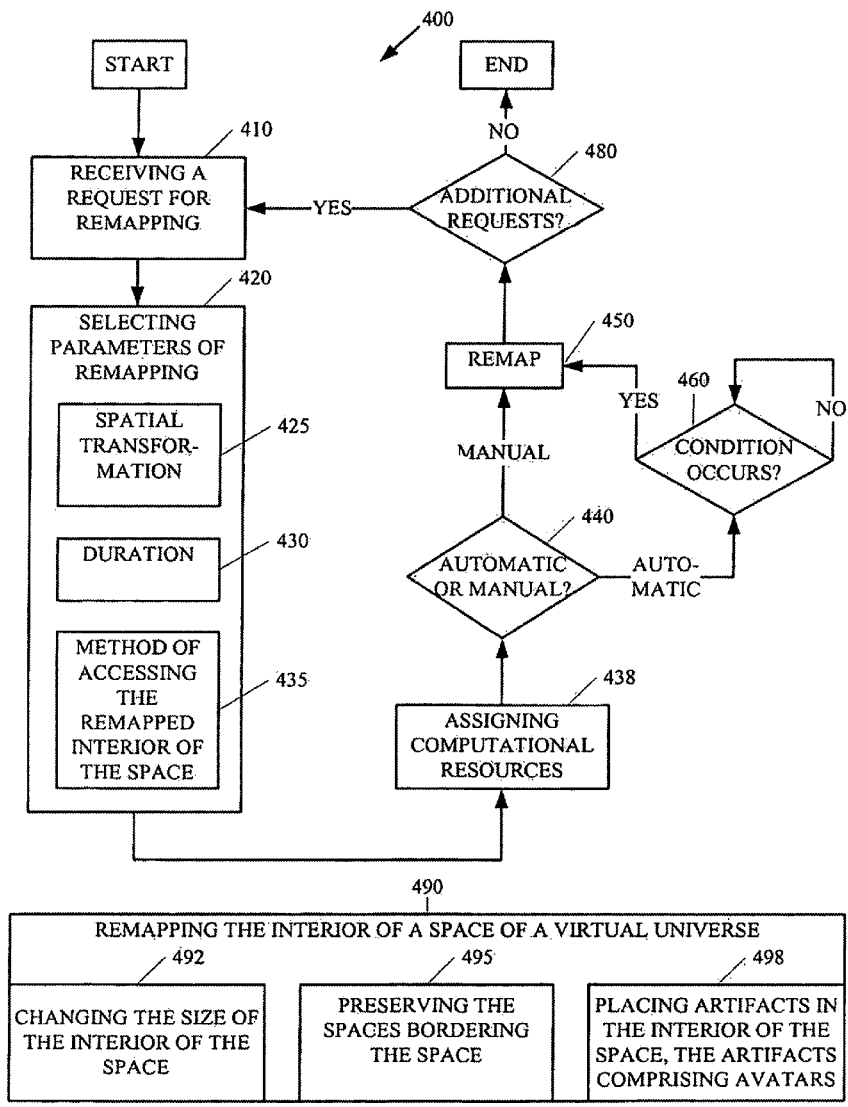
FIG. 4 depicts a flowchart of an embodiment of a method to modify spaces in virtual universes.

FIG. 4 depicts a flowchart 400 of an embodiment of a method to modify space in a virtual universe. Flowchart 400 of FIG. 4 begins with receiving a request for remapping (element 410). A resident of a virtual universe may desire additional space or otherwise desire a remapping of space. For example, the resident may wish to convert an ordinary apartment into a luxury apartment or to expand a retail establishment. Alternatively, the resident may be unable to use common space. For example, a group may be unable to use a conference room, because another group is meeting there. The resident may then inform the virtual universe of the need for additional space.

The virtual universe may select the parameters of the remapping (element 420). One parameter may govern the type of spatial transformation (element 425). Some remappings may produce another version of the original space. Some of these remappings may be linear. For example, the interior of a room may be doubled in size, with the distance between avatars doubled. Other remappings may be nonlinear. In a nonlinear (e.g. fisheye) mapping, a room may be able to hold more avatars that are visible to each other—but visual distortions may be produced. In a few remappings, multiple versions of an original space may be produced. For example, several versions of a conference room may be produced, to allow multiple meetings simultaneously. A version may consist of a copy of the original space or a transformation of the original space. The remapping computations may be performed in many ways that are known in the geometric literature dealing with scaling and related transformations.

Another parameter may govern the duration of the remapping (element 430). Some remappings may be of long-term duration (static). For example, a resident may manually request that his house be doubled in size, as perceived from within the space, without actually growing the house into his neighbor's yard. The interior of the house may remain doubled in size until the resident requests additional space, or the resident quits the virtual universe, or some other new circumstance arises.

Other remappings may be dynamic, based upon conditions within the space. For example, a smart virtual universe room may determine that the number of avatars per square foot, or per cubic foot, is above a threshold and then make a request for remapping. Still other remappings may be temporary. For example, the interior of a conference room may be temporarily remapped into multiple copies when two groups attempt to meet at the same time. The additional copies may be removed from the virtual universe after the meetings have completed.

Another parameter may govern the method of accessing the remapped interior of the space (element 435). In many embodiments of remappings with a single version of the original space, the methods of navigating to the original space may govern access to the remapped space. For example, a resident may use the same keys of the keyboard to navigate to the space. In some embodiments of remappings with multiple versions of the original space, a resident may use additional keys to select among the copies. In other embodiments, the virtual universe may provide a menu, and a resident may select the appropriate version of the space from the menu. In a few embodiments, the virtual universe may insert the resident in a version of the remapped space based upon information about the resident. For example, an IBM resident may be placed in a conference room for an IBM meeting, while an employee of another corporation may be placed in a different conference room.

The virtual world may assign computational resources to render the space after remapping (element 438). A remapped space may require additional computational resources. The remapped space may be capable of holding more objects. As an object may be represented by 3-D geometrical coordinates meshes, and textures, additional objects may require additional resources. In many embodiments, the computational resources may be provided by servers. As an upper bound, the servers assigned to a space may be made proportional to the size of the space.

Several strategies for computing the remapped space are available. In some cases, a virtual universe may utilize dynamic load rebalancing over the available servers in order to accomplish rendering of the new remapped space. In many cases, the remapped space may be handled by the same server as the original space. For example, both the original space and the remapped space may constitute a small portion of a region of the virtual universe handled by a single server. In a few cases, the remapped space may be handled by a different server than the original space. In several cases, rendering the remapped space may be divided among a set of servers as specified by the scaling factor of the remapped space.

If the remapping is a one-time, permanent remapping (manual) (element 440), the virtual universe may perform the remapping (element 450). For example, a resident may wish to permanently convert an apartment to a luxury apartment. If the remapping depends on conditions (automatic), the virtual universe may check whether the condition has occurred (element 460). For example, a nightclub may automatically expand to keep below a certain density of avatars. If the condition has occurred, the virtual universe may remap the space (element 450). If the condition has not occurred, the virtual universe may keep checking for the occurrence of the condition (looping through element 460).

Element 490 provides an expanded view of element 450. Remapping includes changing the size of the interior of the space (element 492), preserving the spaces bordering the space (element 495), and placing artifacts in the interior of the space (populating the space) (element 498). The artifacts may include avatars.

Changing the size of the interior of the space (element 492) may be performed according to the parameters selected in element 425. In many instances, changing the size of the interior of the space constitutes increasing the size of the space. A resident may request a remapping in order to obtain additional space, either personal space or business space. While the remapping of FIG. 4 changes the size of the interior of the space, it preserves the spaces bordering the space (element 495). For example, the interior of an apartment may be quadrupled in size, but the adjoining apartments, walls, and hallways are not moved. An external view of the apartment may not disclose the roomier interior. The appearance of the apartment to a user on the outside may remain the same as before the remapping. Upon entry into the apartment, however, the resident would see the expanded interior space.

In populating the remapped interior (element 498), the virtual universe may use the artifacts from the original space or may use new artifacts, or may use a combination of both. The artifacts from the original space may be spread throughout the remapped space or placed in a portion of the remapped space corresponding to the original space. For example, a remapping may double the length and width of a nightclub. The avatars in the nightclub before the remapping may be spread throughout the expanded nightclub proportionately; that is, an avatar at location (x, y) in the original space may be placed at location (2x, 2y) in the expanded space. Other artifacts from the original space, such as tables and chairs, may also be placed in the expanded, space. Additional tables and chairs may also be placed in the expanded space. The avatars in the remapped space may be the same size as in the original space, and thus proportionately smaller. Some landmark artifacts, such as murals, windows, and doors, may be rendered larger, to increase visibility and enable residents to navigate more easily through the space. As another example, a retail space may be remapped to allow space for a new department. Avatars and other artifacts in the current departments may be placed in the same locations in the remapped space. The new department may be populated with new counters, new fixtures, and new merchandise.

The embodiment of FIG. 4 is for illustration and not for limitation. Other embodiments may add or subtract elements or perform them in a different order. In some embodiments, a virtual universe may charge a fee for remapping space. In many embodiments, dynamic remappings may not be available, and element 460 may be omitted.

FIG. 5A depicts ah example of a space before remapping and FIG. 5B depicts the space after remapping. The exterior view 500 of the original space (FIG. 5A) shows four spaces, space 1 (505), space 2 (510), space 3 (515), and space 4 (520) with some separation. The space, for example, may consist of offices and the separation may be a hallway. The interior view of space 2 (530) shows three avatars (540, 545, and 550) around a conference table (555).

FIG. 5B shows the space of FIG. 5A after the remapping of the interior of space 510. The exterior view 560 of the remapped space in FIG. 5B also shows four spaces, space 1 (565), space 2 (570), space 3 (575), and space 4 (580) with some separation. The exterior view 560 of the remapped space is identical to the exterior view 500 of the original space. In particular, the remapping of the interior of space 2 (585) did not affect the exterior of space 2 (570), the exteriors of spaces 1, 3, and 4 (565, 575, and 580 respectively), or the separations between the spaces.

The interior view 585 of the remapped space shows an expansion of the interior of the original space 2. The remapped interior has the same width and roughly twice the height. The interior of space 2 is populated with the artifacts of the original space (avatars 540, 545, and 550 and conference table 555) and additional artifacts (avatars 590 and 593 and conference table 597). The original artifacts are positioned in an area corresponding to the original space and the new artifacts are positioned in a separate space.

Figure 6A:
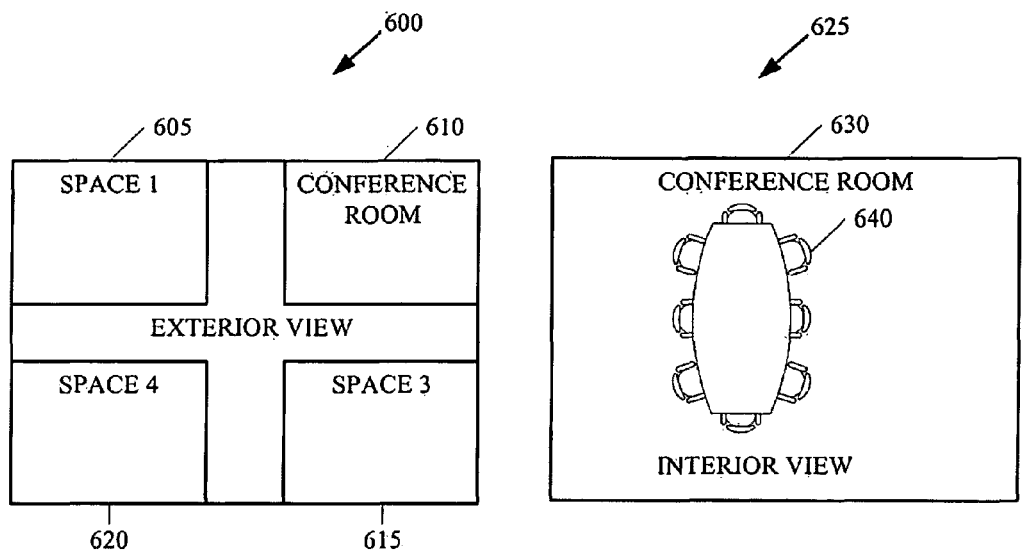
FIG. 6A depicts another example space in a virtual universe before remapping.
Figure 6B:
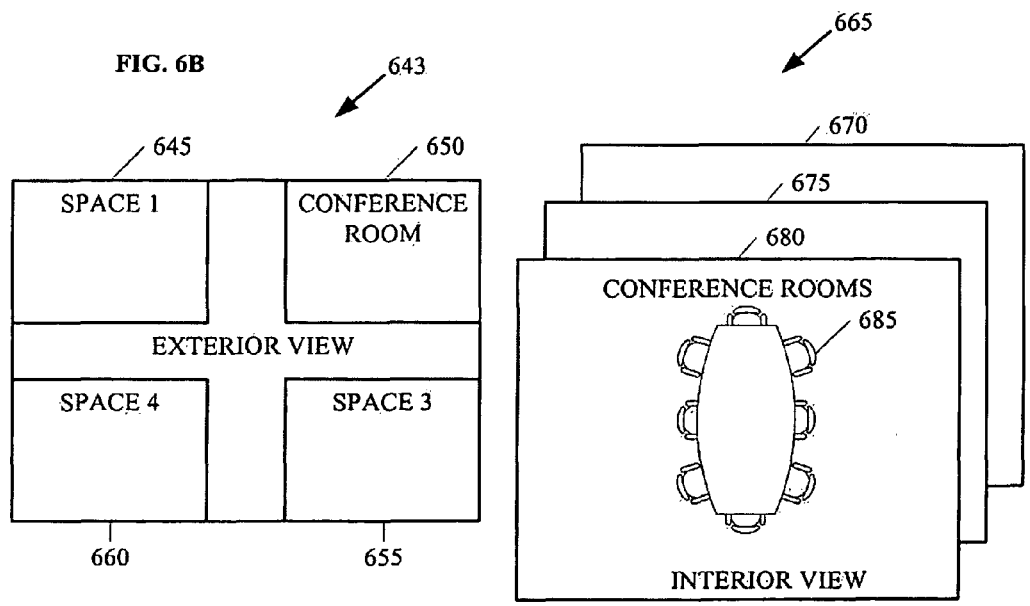
FIG. 6B depicts the example space of FIG. 6A after remapping.

Turning to FIGS. 6A and 6B, shown is another example of a space, before remapping (FIG. 6A) and after remapping (6B). In the examples of FIG. 6, three copies of the original interior space are created in the remapped space, but the three copies have a single exterior. The exterior view 600 of the original space (FIG. 6A) shows four spaces, space 1 (605), conference room (610), space 3 (615), and space 4 (615) with some separation. The interior view 625 of the conference room (630) shows space containing a conference table (640).

The exterior view 643 of the remapped space in FIG. 6B also shows four spaces, space 1 (645), conference room (650), space 3 (655), and space 4 (660), with some separation. The exterior view 643 of the remapped conference room is identical to the exterior view 600 of the original space. In particular, the remapping of the interior of conference room 610 did not affect the exterior 650 of conference room, the exteriors of spaces 1, 3, and 4 (645, 655, and 660 respectively), or the separations between the spaces.

The interior view 665 of the remapped space shows three copies of the interior of the original space, conference rooms 670, 675, and 680. Conference room 680 contains a conference table (685). In FIG. 6B, the remapping has created three copies of the original space. In some embodiments, a resident may navigate to the exterior 650 of the remapped conference room and use a set of navigation keys to reach the desired interior, one of 670, 675, or 680.

The invention can take the form of an entirely hardware embodiment; an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for modifying spaces in virtual universes, the computer program product accessible from a computer-usable or computer-readable medium providing program code for use by or in connection with a computer or any instruction execution system. For the purposes of this description, a computer-usable or computer-readable medium can be any apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for modifying spaces in virtual universes. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of modifying spaces of virtual universes, said method comprising:

a computer displaying (i) an exterior view of a composite space of a virtual universe, said composite space consisting of a first space and additional space bordering the first space, wherein a closed exterior boundary of the composite space that surrounds the composite space is depicted in the displayed exterior view of the composite space as being totally within a first plane, and wherein a closed exterior boundary of the first space that surrounds the first space is depicted in the displayed exterior view of the composite space as being totally within the first plane and as separating the first space from the additional space and (ii) an initial interior view of only the first space, wherein the closed exterior boundary of the first space is depicted in the displayed initial interior view of only the first space as being totally within a second plane that is parallel to the first plane, and wherein the first space is displayed differently in the initial interior view than in the exterior view;

said computer remapping the initial interior view of only the first space without changing the exterior view of the composite space, said remapping comprising changing a size of the first space in the initial interior view of only the first space; and said computer displaying the remapped interior view of the first space including displaying the closed exterior boundary of the first space.

2. The method of claim 1, wherein said remapping the initial interior view of only the first space comprises expanding the initial interior view of only the first space linearly along one or more dimensions of the first space.

3. The method of claim 1, wherein said remapping the initial interior view of only the first space comprises the computer contracting the initial interior view of only the first space linearly along one or more dimensions of the first space.

4. The method of claim 1, wherein said remapping the initial interior view of only the first space comprises the computer remapping the initial interior view of only the first space by a non-linear transformation.

5. The method of claim 1, wherein said remapping the initial interior view of only the first space comprises the computer creating multiple copies of the initial interior view of only the first space.

6. The method of claim 5, wherein the method further comprises:
said computer receiving user input to control movement of avatars between different copies of the multiple copies.

7. The method of claim 6, wherein said receiving user input to control movement of avatars between different copies of the multiple copies comprises receiving user input to send a first group of avatars representing a group of employees of a first company to a first copy of the different copies of the multiple copies and to send a second group of avatars representing a group of employees of a second, different company to a second copy of the different copies of the multiple copies.

8. The method of claim 1, wherein the method further comprises:
said computer placing a plurality of artifacts in the initial interior view of only the first space, wherein the plurality of artifacts include a first avatar and are depicted in the displayed initial interior view of only the first space; and
said computer placing additional artifacts in the remapped interior view of the first space, wherein the additional artifacts include a second avatar and are depicted, along with the plurality of artifacts, in the displayed remapped interior view of the first space.

9. The method of claim 1, wherein a portion of the exterior view of the first space coincides with a portion of the exterior view of the composite space.

10. The method of claim 1,
wherein each spatial point in the initial interior view of only the first space is represented by a coordinate (x, y) relative to an origin (0,0) of a two-dimensional Cartesian coordinate system in which x and y represent a horizontal distance and a vertical distance, respectively, of each spatial point from the origin, and
wherein said remapping the initial interior view of only the first space comprises transforming each coordinate (x, y) to a corresponding remapped coordinate in the remapped interior view of only the first space.

11. The method of claim 10, wherein the remapped coordinate is (Cx,CY), and wherein C is a positive constant differing from 1.

12. The method of claim 11, wherein C is less than 1.

13. The method of claim 11, wherein C is greater than 1.

14. The method of claim 10, wherein the x component of the remapped coordinate is tan h(x).

15. The method of claim 1,
wherein each spatial point in the initial interior view of only the first space is represented by a coordinate (x, y, z) relative to an origin (0, 0, 0) of a three-dimensional Cartesian coordinate system in which x, y, and z represent three mutually orthogonal distances of each spatial point from the origin, and
wherein said remapping the initial interior view of only the first space comprises transforming each coordinate (x, y, z) to a corresponding remapped coordinate in the remapped interior view of only the first space.

16. A computer system for modifying spaces of virtual universes, the computer system comprising one or more processors, one or more computer-readable memories, one or more computer-readable tangible storage devices, and program instructions stored on the one or more storage devices for execution by the one or more processors via the one or more memories, wherein the stored program instructions further comprise:
program instructions to display (i) an exterior view of a composite space of a virtual universe, said composite space consisting of a first space and additional space bordering the first space, wherein a closed exterior boundary of the composite space that surrounds the composite space is depicted in the displayed exterior view of the composite space as being totally within a first plane, and wherein a closed exterior boundary of the first space that surrounds the first space is depicted in the displayed exterior view of the composite space as being totally within the first plane and as separating the first space from the additional space and (ii) an initial interior view of only the first space, wherein the closed exterior boundary of the first space is depicted in the displayed initial interior view of only the first space as being totally within a second plane that is parallel to the first plane, and wherein the first space is displayed differently in the initial interior view than in the exterior view;
program instructions to remap the initial interior view of only the first space without changing the exterior view of the composite space, wherein the program instructions to remap the provided interior view of the first space change a size of the first space in the initial interior view of only the first space; and
program instructions to display the remapped interior view of the first space including program instructions to display the closed exterior boundary of the first space.

17. The computer system of claim 16, wherein the stored program instructions further comprise:
program instructions to take a census to determine satisfaction of a condition, and wherein the program instructions to remap the initial interior view of only the first space comprise program instructions to remap the initial interior view of only the first space based upon said census.

18. A computer program product for modifying spaces of virtual universes, the computer program product comprising one or more computer-readable tangible storage devices and program instructions stored on at least one of the one or more storage devices, wherein the stored program instructions comprise:
program instructions to display (i) an exterior view of a composite space of a virtual universe, said composite space consisting of a first space and additional space bordering the first space, wherein a closed exterior boundary of the composite space that surrounds the composite space is depicted in the displayed exterior view of the composite space as being totally within a first plane, and wherein a closed exterior boundary of the first space that surrounds the first space is depicted in the displayed exterior view of the composite space as being totally within the first plane and as separating the first space from the additional space and (ii) an initial interior view of only the first space, wherein the closed exterior boundary of the first space is depicted in the displayed initial interior view of only the first space as being totally within a second plane that is parallel to the first plane, and wherein the first space is displayed differently in the initial interior view than in the exterior view;

program instructions to remap the initial interior view of only the first space without changing the exterior view of the composite space, wherein the program instructions to remap the provided interior view of the first space change a size of the first space in the initial interior view of only the first space; and program instructions display the remapped interior view of the first space including program instructions to display the closed exterior boundary of the first space.

19. The computer program product of claim 18, wherein the program instructions to remap the initial interior view of only the first space comprise program instructions to expand the initial interior view of only the first space linearly along one or more dimensions of the interior view of the first space.

20. The computer program product of claim 18, wherein the program instructions to remap the interior view of the first space comprise program instructions to contract the initial interior view of only the first space linearly along one or more dimensions of the initial interior view of only the first space.

21. The computer program product of claim 18, wherein the program instructions to remap the initial interior view of only the first space comprise program instructions to create multiple copies of the initial interior view of only the first space.

* * * * *